US012116963B2

(12) United States Patent
Van Keulen et al.

(10) Patent No.: US 12,116,963 B2
(45) Date of Patent: Oct. 15, 2024

(54) MONITORING SYSTEM, METHOD AND VEHICLE COMPRISING SUCH A SYSTEM, FOR DETECTING CLOGGING THROUGH FOULING OF AN AIR FILTER OF AN INTERNAL COMBUSTION ENGINE

(71) Applicant: DAF Trucks N.V., Eindhoven (NL)

(72) Inventors: Thijs Adriaan Cornelis Van Keulen, Eindhoven (NL); Ignace Theodorus Maria Van Den Heuvel, Eindhoven (NL)

(73) Assignee: DAF Trucks N.V., Eindhoven (NL)

( * ) Notice: Subject to any disclaimer, the term of this patent is extended or adjusted under 35 U.S.C. 154(b) by 271 days.

(21) Appl. No.: 17/721,631

(22) PCT Filed: Nov. 6, 2020

(86) PCT No.: PCT/NL2020/050698
§ 371 (c)(1),
(2) Date: Apr. 15, 2022

(87) PCT Pub. No.: WO2021/091385
PCT Pub. Date: May 14, 2021

(65) Prior Publication Data

US 2022/0403805 A1 Dec. 22, 2022

(30) Foreign Application Priority Data

Nov. 8, 2019 (NL) .................................... 2024196

(51) Int. Cl.
*F02M 35/09* (2006.01)
*F02D 41/14* (2006.01)
(Continued)

(52) U.S. Cl.
CPC ......... *F02M 35/09* (2013.01); *F02D 41/1401* (2013.01); *F02D 41/1445* (2013.01);
(Continued)

(58) Field of Classification Search
CPC ............. F02D 41/1401; F02D 41/1445; F02D 41/1454; F02D 41/22; F02D 2041/1412;
(Continued)

(56) References Cited

U.S. PATENT DOCUMENTS

| | | | | |
|---|---|---|---|---|
| 5,604,306 | A | 2/1997 | Schricker | |
| 10,672,199 | B2 * | 6/2020 | Landolsi | G07C 5/006 |
| 2017/0211498 | A1 | 7/2017 | Moore et al. | |

FOREIGN PATENT DOCUMENTS

| | | | |
|---|---|---|---|
| EP | 2960484 | A1 | 12/2015 |
| WO | 2012077438 | A1 | 6/2012 |

OTHER PUBLICATIONS

International Search Report and Written Opinion—PCT/NL2020/050698—mailing date Feb. 23, 2021.

* cited by examiner

*Primary Examiner* — Hung Q Nguyen
*Assistant Examiner* — Mark L. Greene
(74) *Attorney, Agent, or Firm* — Banner & Witcoff, Ltd.

(57) ABSTRACT

A monitoring system and method for detecting clogging through fouling of an air filter (3) of an internal combustion engine (5) comprising a differential pressure sensor means (7) for determining a differential pressure between an ambient environment and a position directly downstream of the air inlet filter. The system further comprising at least one exhaust flow sensor means (9) for determining the exhaust flow, and a controller (13) which is communicatively connected to each of the sensor means for processing information therefrom. The controller is arranged for determining a first filter resistance coefficient based on, at least, a measurement of the differential pressure, and the exhaust flow. The system is arranged for, using the controller, to calculate a second filter coefficient based on the historic evolution of the first filter coefficient, the controller further arranged for
(Continued)

comparing the second filter coefficient to a boundary value, and generating a clogging alarm signal when the second filter coefficient exceeds said boundary value.

20 Claims, 7 Drawing Sheets

(51) Int. Cl.
*F02D 41/22* (2006.01)
*F02M 35/10* (2006.01)

(52) U.S. Cl.
CPC ......... *F02D 41/1454* (2013.01); *F02D 41/22* (2013.01); *F02M 35/1038* (2013.01); *F02D 2041/1412* (2013.01); *F02D 2041/1417* (2013.01); *F02D 2041/1429* (2013.01); *F02D 2041/1433* (2013.01)

(58) Field of Classification Search
CPC ..... F02D 2041/1417; F02D 2041/1429; F02D 2041/1433; F02M 35/09; F02M 35/1038
See application file for complete search history.

Air Filter clogging monitor flow diagram

MONITORING SYSTEM, METHOD AND VEHICLE COMPRISING SUCH A SYSTEM, FOR DETECTING CLOGGING THROUGH FOULING OF AN AIR FILTER OF AN INTERNAL COMBUSTION ENGINE

CROSS-REFERENCE TO RELATED APPLICATIONS

This application is a U.S. National Stage application under 35 U.S.C. § 371 of International Application PCT/NL2020/050698 (published as WO 2021/091385 A1), filed Nov. 6, 2020, which claims the benefit of priority to Application NL 2024196, filed Nov. 8, 2019. Benefit of the filing date of these prior applications is hereby claimed. Each of these prior applications is hereby incorporated by reference in its entirety.

The invention relates to a monitoring system and a method for detecting clogging through fouling of an air filter of an internal combustion engine (ICE).

Vehicles may be propelled through the use of an internal combustion engine that directly or indirectly provides propelling power to the vehicle drive wheels. As is well known, internal combustion relies on a sufficient amount of air being supplied to the combustion chambers of the internal combustion engine. The combustion air is in general drawn from the surroundings of the internal combustion engine, such as ambient air of a vehicle. Oftentimes, as is in general the case with regard to vehicles, the air being supplied to the combustion chambers is arranged to pass through an air intake conduit, consisting, inter alia, of suitable piping for channeling ambient air to the combustion chambers, and an air filter. The air filter cleans the air entering the internal combustion engine and also prevents e.g. debris from entering the internal combustion engine and possibly causing damage. An adverse effect of using air filters, however, is that the air filter affects the airflow. When the air filter becomes filled from filtering the air passing through it, as time progresses, the filtering capacity is reduced and also the flow through the filter may also be reduced thereby affecting engine operation. In relation to a clogged filter, a clean, i.e. empty, air filter may improve internal combustion engine operation e.g. with regard to, for example, gas mileage, vehicle acceleration, engine life, emission levels etc. A clogged filter may, for example, have the consequence that the desired volume of clean air to be supplied to the combustion may not reach the combustion chambers, which in turn may affect emissions and/or result in too rich air/fuel ratios. Air filters of e.g. vehicles are therefore replaced at regular intervals, where such intervals may be determined e.g. by the vehicle manufacturer. However, the rate at which the filter is becoming filled with particles collected from the air passing through may differ substantially in dependence on the environmental conditions in which the vehicle is travelling. The filter exchange interval may be set beforehand e.g. according to a worst-case scenario, thereby resulting in unnecessarily frequent filter exchanges, and service stops associated therewith, than that in reality may be accounted for. Therefore, in addition to regular service intervals, vehicles may comprise an onboard diagnostics system that may determine whether an air filter is clogged and should be subject for replacement. Presently known diagnostic systems rely on detection of a pressure drop measured over the filter directly. This method is simple and effective, but may be susceptible to erroneous readings, or temporary clogging events which resolve themselves, however such diagnostic system itself will not reset. Temporary clogging may for example occur when rain wets the filter and changes its permeability until dried.

Filters permanently clog as dust and other particles gather on the filter. This type of clogging occurs gradually over time. As such, there is a need to improve detection of a more permanent state of clogging of the filter and to reduce erroneous readings.

To this end the invention provides, according to a first aspect of the invention, a monitoring system for detecting clogging through fouling of an air filter of an internal combustion engine. The system comprises a differential pressure sensor means for determining a differential pressure between an ambient environment and a position directly downstream of the air inlet filter. The system also comprises at least one exhaust flow sensor means for determining the exhaust flow, and a controller which is communicatively connected to each of the sensor means for processing information therefrom. The controller is arranged for determining a first filter resistance coefficient based on, at least, a measurement of the differential pressure, and the exhaust flow. The system is arranged for, using the controller, to calculate a second filter coefficient based on the historic evolution of the first filter coefficient, the controller further arranged for comparing the second filter coefficient to a boundary value. The system is further also arranged for generating a clogging alarm signal when the second filter coefficient exceeds said boundary value. Optionally the boundary value can be set at a value representative of half an initial permeability of the filter.

Further according the first aspect of the invention the system may be arranged, by means of the controller, for logging the first filter coefficient over time. The controller is arranged for fitting a function over at least some of the logged data, for predicting the first filter coefficient, and wherein the calculation of the second filter coefficient comprises updating the first filter coefficient by means of a predicted filter coefficient from the fitted function. Optionally, at least some of the logged data is given to mean a period of the most 40 hours of the system being activity, or when the period of activity since the last filter change is below 6 hours, the entire period of activity of the system since the last filter change. In extension, a function, such as a linear function, may even be fitted over the logged first filter coefficient data to project the progress of steady permeability decline of the filter. The first filter coefficient determined from pressure and flow measurements may be averaged with, or used together with, the predicted value as per the fitted function to arrive at the calculated second filter coefficient.

It can be understood that such a fitted function would represent the relationship of the first filter coefficient with respect to the amount of time that system has been active since filter replacement or initialization. Optionally, The fitted function may be established using the least squares method and can be used to predict the first filter coefficient value at a time of measurement, further optionally taking into consideration the variation of the fitted filter coefficient.

The first filter coefficient determined from pressure and flow measurements may be averaged with, or used together with, the predicted value as per the fitted function to arrive at the calculated second filter coefficient used for a threshold check.

The controller may be arranged for logging, fitting such a fitted function and for calculating of the second filter coefficient as described. The fitted function may be fitted such that outliers are discarded, such as to prevent erroneous influence on the calculation of the second filter coefficient.

To this end the controller may also be arranged to discard outliers for the fitting of the function The calculation of the second filter coefficient based on the historic evolution of the first filter coefficient may be seen as an adaptation of a first filter coefficient based on the evolution of the differential pressure, and in particular the stochastic evolution of the differential pressure not explained by changes in the operation of the engine. Stochastic here meaning random in the sense that the evolution of the differential pressure is subject to random environmental events which effect the filter, such as clogging events through fouling and wetting. The manner in which the first filter coefficient changes in time may itself be modeled, such as through means of a moving average, and used to compare whether certain changes in the first filter coefficient are reliably in line with the evolution of the first filter coefficient. Predicted model values of the first filter coefficient may be used to calculate the second filter coefficient to arrive at a more accurate value for the second filter coefficient. Further to this aspect of the invention the controller may be arranged to model the differential pressure as a function of the mass flow, wherein the first filter coefficient is defined by a model parameter of the function, and wherein preferably the function is a quadratic function. Such a model allows the system, based on an initially determined or initialization value of the first filter coefficient and the measured mass flow, to determine an estimated differential pressure. Differences between the estimated differential pressure and the measured differential pressure here reflect the random environmental influences which influence the filter permeability, which is in turn reflected in the first filter coefficient. The difference between the measured differential pressure and the estimated differential pressure can be used to calculate the second filter coefficient such that it fits the measured data. In order to determine of the first filter coefficient the controller may, further to this same aspect of the invention, have a controller arranged for using linear quadratic estimation. This allows the second filter coefficient to remain dependent on a previous value. This prevents outlier differential pressure measurement accidentally setting off a faulty filter alarm. However, corrections to such a coefficient may also be influenced by model inaccuracies, as any model merely approximates the relation between differential pressure and the mass flow. Furthermore, measurement errors inherent to sensors may also be reflected in any correction of the model coefficient. The controller is arranged such that the measured and modelled pressure are compared and wherein the model parameter defining the first filter coefficient is also determined based on measured data, at least comprising the measured pressure, under consideration of variation, such as to compensate for measurement noise and model uncertainties. Optionally, the system may also be arranged such that the measured and modelled pressure are compared and wherein the model parameter defining the first filter coefficient is also determined based on measured data, at least comprising the measured pressure, under consideration of variation, such as to compensate for measurement noise and/or model uncertainties. According to embodiments of this aspect of the invention the pressure measurement data by which the model parameter is adapted can comprise multiple sequential differential pressure measurements and corresponding multiple sequential exhaust flow measurements. The mean of each of the sequential measurements may be used in the (quadratic) model equation to arrive at the second filter coefficient for comparison to a boundary value. Alternatively to a mean each measurement may be assigned a weight and summed, these sums may then be used in the model equation. Other options may also be considered. The sequence may end in the present and stretch multiple measurement moments into the past. It is expressed that any of the past measurements of mass flow and differential pressure by themselves could have yielded the first filter coefficient at that particular moment in time. Due to the use of sequential measurements to arrive at a single first filter coefficient the historic evolution of said first filter coefficient is in this manner reflected in the second filter coefficient.

According to a preferred embodiment the system is arranged to be inactive below an air flow below 100 g/s. This can be understood to mean that the controller is arranged to only perform steps (ii) and (iii) when, in use, the determined air flow exceeds 100 g/s. When the air flow drops below 100 g/s the system is deactivated again.

Optionally, the second filter coefficient is compared to a boundary value at predetermined time intervals, such as intervals of 1 hour. A benefit is that this allows short term events to be corrected for in between moments of measurement. This will increase the accuracy of clogging detection.

The system may be expanded to also comprise an oxygen concentration sensor for measuring oxygen concentration in an exhaust of the engine. The system is arranged for processing the measured oxygen concentration in combination with the exhaust flow and differential pressure to determining a statistical off-set in measured differential pressure. The system is arranged to suppress a clogging alarm signal when the off-set exceeds a predetermined value, such as 0.4 kPa. This beneficially allows the system to differentiate between a clogged filter and a faulty sensor. Additionally, it allows for the sensor to be recalibrated in between moments wherein the second filter coefficient is checked against a threshold value. As such the system may be arranged to compensate for the off-set in the measured differential pressure for calculate the second filter coefficient. Such as when the off-set remains below 0.4 kPa. It is further possible that the controller be arranged for suppressing a clogging alarm signal and for generating a pressure sensor alarm signal when, in use, the off-set exceeds an off-set boundary value. This allows a user to be alerted to the fact that there is a sensor issue which may need to be checked. This prevents unnecessary filter replacements. A diesel engine may be arranged to recirculate exhaust gas. Any mass flow, air or exhaust gas, may effected by the recirculation either in measurement or calculation. Simple mass balances depending on the position of the sensor means may allow the controller to estimate an actual mass flow taking into account the percentage of recirculation, which depends on the valve setting of the exhaust gas recirculation valve. This EGR valve may be controlled by the controller such that the setting and thus recirculation percentages are know. The controller may be arranged for manipulating the determined mass flow based on the recirculation of exhaust gas. This allows for more accurate measurements which prevent erroneous clogging detections.

According to a second aspect of the invention there is provided a method for detecting clogging through fouling of an air filter to an internal combustion engine wherein the method comprises measuring a differential pressure, using a differential pressure sensor means, between an ambient environment and a position directly downstream of a air inlet filter of the engine. The method further comprises measuring an exhaust flow, such as by using a flow sensor means, in an exhaust of the engine. The method also comprises determining a first filter resistance coefficient ($\alpha_K$) based on, at least, the differential pressure, and the exhaust flow. Additionally, the method comprises calculating a second filter coefficient based on the historic evolution of the first filter coefficient, comparing the second filter coefficient ($\alpha_K$) to a boundary value, and generating a clogging alarm signal when the second filter coefficient exceeds said boundary value Further method features can be found in claims 13 to 19. Benefits for each are previously explained herein in corresponding features according to the first aspect of the invention, According to a third aspect of the invention there is provided a vehicle comprising system according to the first aspect of the invention wherein the vehicle comprises a human interface arranged for generating an audio and/or visual alarm based on the clogging alarm signal. Considering corresponding features according to the first aspect of the invention it may also be possible for the system to be arranged for generate a clogging alarm and for generating a pressure sensor alarm based the clogging alarm signal and pressure sensor alarm signal respectively.

Further advantageous aspects of the invention will become clear from the appended description and in reference to the accompanying drawings, in which.

Figure 1:
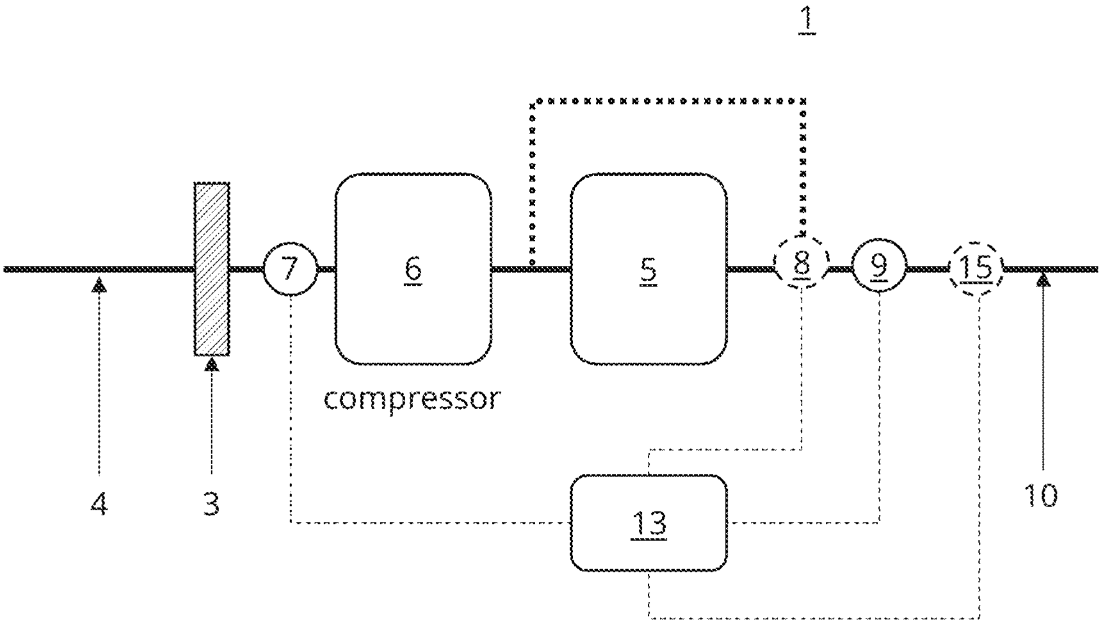
FIG. 1 shows a schematic view of a system according to the invention.

FIG. 1 shows a schematic view of a system 1 for detecting clogging through fouling of an air filter 3 of an internal combustion engine (ICE) 5. In this system the ICE is provided as a diesel engine to which air is fed via a compressor 6. In order to filter the air that will end up in the ICE the filter is arranged in an inlet to this compressor. Generally a diesel engine has an exhaust gas recirculation (EGR) capability. However, this is merely optional to the invention as other ICE's exist which do not use EGR. In this example exhaust gas recirculation is thus also shown as optional. The exhaust 10 may for the purpose of regulating exhaust gas recirculation comprises an exhaust gas recirculation (EGR) valve 8 which can be controlled by a controller 13 such as an engine control unit (ECU). The system 1 has a differential pressure sensor means 7, such as a differential pressure sensor, which is arranged for determining a differential pressure between an ambient environment, such as outside of the air flow path to the engine, and a position directly downstream of the air inlet filter 3, namely between the filter 3 and the compressor 6. The system further has at least one exhaust flow sensor means 9 for determining the exhaust flow. The flow sensor means can be an actual flow sensor, as per this example, or a combination of engine sensors from which exhaust flow can be determined by the controller, such as a torque and engine speed sensor combination (not shown, but customary). Optionally an oxygen sensor 15 is present. The controller 13 is part of the system and is in this example communicatively connected, such as by wire or wireless connection, to each of the sensor means 7, 9 or 15 for processing information therefrom.

Initialization

Figure 2:
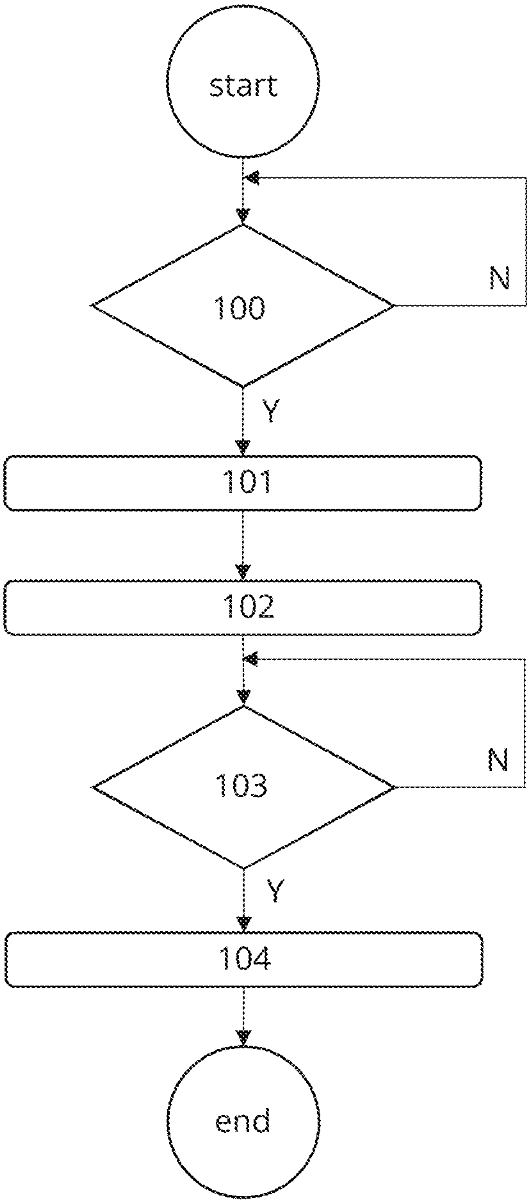
FIG. 2 shows a flow diagram of a method according to the invention.

The system 1 is arranged to perform the steps as shown in FIG. 2. The system initializes at step 100, wherein the controller 13 checks whether the mass flow of air flow is equal to or exceeds 100 g/s. When mass flow remains below 100 g/s the system does not proceed to further steps, but instead continues to monitor the air flow. When, in use, the mass flow is determined to exceed 100 g/s step 100 leads to step 101. In step 101 the system uses a model according to function 1.

$$\Delta P_{mod}=\alpha_{K,t-1}\cdot\rho\cdot(m_{measured,t}/\rho)^2 \quad \text{function 1}$$

In function 1 the modelled differential pressure is symbolized as $\Delta P_{mod}$ (kPa), the mass flow at a moment in time t is symbolized as $m_{measured,t}$ (kg/s). Moment in time t symbolizes the present. The mass flow is determined from measurements using the flow measurement means 9. The air density before the compressor is symbolized as ρ (kg/m3). The air density may be estimate d based on other sensor information, or taken as the atmospheric air density at room temperature. The ECU is arranged to estimate or determine this density. Atmospheric air pressure is generally in the range of 50-120 kPa and may vary depending on altitude and humidity. The filter first resistance coefficient is symbolized as $\alpha_{K,t-1}$ and is either initialized at a predetermined value, which corresponds to a clean filter, in this example $-2.05\cdot10^{-5}$ 1/m$^4$, or a previous, such as at most a recent moment in time t−1 prior to moment t, value of $\alpha_K$. Step 101 leads to step 102. Moment in time t−1 thus symbolizes a moment in the past.

The Algorithm

In step 102 the controller uses linear quadratic estimation. The measured differential pressure is used to compare the modeled and measured differential pressures. In this example the algorithm uses a second function, namely function 2. From this second function the currently observed first filter resistance coefficient $\alpha_{K,t}$ is determined based on the measured differential pressure and.

$$\Delta P_{measured,t}=\alpha_{K,t}\cdot\rho\cdot(m_{measured,t}/\rho)^2 \quad \text{function 2}$$

In function 2 the measured differential pressure at moment t is symbolized as $\Delta P_{measured,t}$ (kPa). The filter resistance according to measurement at moment t is $\alpha_{K,t}$. In this example the algorithm keeps track of the estimated differential pressure of the system. Functions 1 and 2 are estimate functions and thus can vary with respect to reality. Additionally, sensor means measurements are subject to measurement noise. Taking the noise (sensor means, model accuracy) into consideration, the algorithm is used to adapt the first filter coefficient $\alpha_{K,t}$ to take on an amended value in accordance with function 3, this amended value is the second filter coefficient.

$$\alpha_{K,t'}=w_1\cdot\alpha_{K,t}+w_2\cdot\alpha_{K,t-1} \quad \text{function 3}$$

In function 3 the first filter coefficient ax at moment t and t−1 from function 1 and function 2 respectively are weighted and summed to update the first filter coefficient, $\alpha_{K,t}$ on the right hand side of function 3, into becoming :=the second filter coefficient, $\alpha_{K,t}$ on the left hand side of function 3. The weights $w_1$, $w_2$ have a value in the range of 0 to 1, and add up to 1. In this example the weights can also be fine tuned to prevent rapid variations in $\alpha_{K,t}$. To this end $w_2$ may be larger than $w_1$. Additionally, the time interval between moments of measurement, such as between t and t−1, is 30 seconds. It will be understood that in a further update cycle, $\alpha_{K,t}$ becomes $\alpha_{K,t-1}$ of function 1 and a new a $\alpha_{K,t}$ is derived through function 2.

Historic Evolution (I)

Looking back at function 2 one can see that this function is a model wherein the differential pressure is a function of the mass flow and wherein the first filter coefficient is defined by a model parameter $\alpha_{K,t}$. However, function 2 may alternatively be written such that it is based on the multiple sequential measurements of differential pressure and mass flow. Function 2 could to this end take on the form of function 4. Herein n are the number of historic measurement points considered, n being 2 or greater. The system may more specifically be arranged to substitute function 2 with function 4 after a number of repeated measurements have been performed, such as a number n+1.

$$\Delta P_{measuredseries}=(\Delta P_{measured,t}+\Delta P_{measured,t-1}+\Delta P_{measured,}+\Delta P_{measured,t-n})/(n+1);$$

$$m_{measuredseries}=(m_{measured,t}+m_{measured,t-1}+m_{measured,}+m_{measured,t-n})/(n+1);$$

$$\Delta P_{measuredseries}=\alpha_{K,t}\cdot\rho\cdot(m_{measuredseries}/\rho)^2 \qquad \text{function 4}$$

In function 4 $\Delta P_{measuredseries}$ and $m_{measuredseries}$ are averages. Function 3 may, in the event wherein function 2 is provided in the form of function 4, be designed such that $w_1$ becomes 1 and $w_2$ becomes 0. However, this is not be necessarily the case as this can allow for a form a double tuning. Namely, the averaging of (rapid) sequential measurements may allow for increased accuracy of the measured $\alpha_{K,t}$ as this reduces the impact of noise in the measurements by the sensor means, it may in such a case still be important to buffer against rapid changes in $\alpha_{K,t}$ in view of $\alpha_{K,t-1}$ by using $w_1$ and $w_2$ in a manner that both are larger than zero in function 3. Function 4 may also be written as a function corresponding to a moving average. Step 102 leads to step 103.

Historic Evolution (II)

Filters permanently clog as dust and other particles gather on the filter. This type of clogging occurs gradually over time; The first filter coefficient as determined may be logged every time it is updated, such as according to function 3. A linear function can be fitted over the logged first filter coefficient data to project the progress of steady permeability decline of the filter. The fitted function here represents the relationship of the first filter coefficient as measured with respect to the amount of time that system has been active since filter replacement or initialization. The fitted function can be established using the least squares method and can be used to predict the expected first filter coefficient value at a time of measurement. The fitted function may take all logged data into consideration since the moment of change to a new filter, or only a part thereof, such as the most recent 40 hours. Of course, depending on the period of system activity. If the system has not yet been active for 40 hours since the change to a new filter, then of course the fitted function may still take all logged data into consideration. It will be understood that the system can been activated and deactivated intermittently, as such only time of the system that is spent active is intended for time keeping in this example. However, this is not necessary. The first filter coefficient derived from pressure and flow measurements may be averaged with the predicted value as per the fitted function to calculate the second filter coefficient used for a threshold check. The controller may be arranged for logging, fitting such a fitted function and calculating of the second filter coefficient as described. The fitted function may be fitted such that outliers are discarded, such as to prevent temporary influence on the first filter coefficient to be included as data points in the fitted function. To this end the controller may also be arranged to discard outliers for the fitting of the function.

This manner of calculation may substitute the prior mentioned calculations such that function 3 may be replaced with function 3'

$$\alpha_{K,t}:=w_1\cdot\alpha_{K,t}+w_3\cdot\alpha_{K,fitted} \qquad \text{function 3'}$$

Herein the weights $w_1$, $w_3$ have a value in the range of 0 to 1, and add up to 1, and wherein $\alpha_{K,fitted}$ is reflective of the predicted value the first filter coefficient would have at time t (the present) using the fitted function.

Alternatively this manner of manipulation may also see integration with the prior mentioned manipulations, for example such that function 3 may be replaced with function 3".

$$\alpha_{K,t}:=w_1\cdot\alpha_{K,t}+w_2\cdot\alpha_{K,t-1}+w_3\cdot\alpha_{K,fitted} \qquad \text{function 3''}$$

Herein the weights $w_1$, $w_2$, and $w_3$ have a value in the range of 0 to 1, and add up to 1. Weights can be chosen to favor the fitted and historical values over newly measured data, such as to allow the system to have a high torpidity in view of momentary changes.

Threshold Check

In step 103 the controller compares the second filter coefficient $\alpha_K$ to a boundary value. The updated first filter coefficient from function 3 $\alpha_{K,t}$ is the second filter coefficient $\alpha_K$ which is compared to a boundary value $\alpha_{K,b}$. In this example the $-4.0\cdot10^{-5}$ 1/m$^4$. This boundary value is chosen to reflect the value for the second filter coefficient wherein the resistance of the filter has increased such that the pressure drop over the filter is persistently double or more compared to the pressure drop of the filter when it is initially installed as clean. As such it is recommended that the filter coefficient chosen as a boundary value is reflective of an increase in pressure drop which is considered unfavorable. The comparison is made once every hour, but this may alternatively be checked at shorter or longer intervals. In this example, the hourly interval for comparison aids in preventing detection of short term clogs such as caused by rain. This checking interval may also be called the debounce time of the monitor, wherein the monitor is a term for the controller program by which the controller monitors the change in second filter coefficient $\alpha_K$ over time. When the value, over time, inevitably drops below $-4.0\cdot10^{-5}$, it during a moment of checking detected that the threshold is exceeded. Step 103 leads to step 104 when the threshold value is crossed, otherwise the check will be performed again after the predetermined debounce time, in this example one hour, has passed.

Alarm Signal

In step 104, once it is detected that the threshold is exceeded, the controller generates an alarm signal. In a vehicle, such as a car or truck, a human interface may be arranged for generating an audio and/or visual alarm based on the clogging alarm signal. Thus, alerting the driver of the vehicle to the fact that the filter needs to be checked. The system may be arranged, also separately from this example, to continue diagnosis, such as to continue detection operations, also after generating the alarm as the filter may restore itself to have an acceptable permeability. An erroneous alert may in such a case correct itself in time. The system would be able to cancel the alarm and/or alarm signal to allow the driver to understand that the detected filter clogging did not persist.

Pressure Sensor Check (I)

It is further noted that the air flow through the filter may additionally be derived based on the known mass flow of fuel. Based on the combustion stoichiometry between air (oxygen in the air), level of completeness of the combustion, and the mass flow of fuel $m_{air}$, one can derive how much air was present during combustion. More in particular, the air-to-fuel ratio measurement states that the mass flow of air $m_{air}$ through the filter must be equal to the stoichiometric ratio $L_{stoichiometry}$ between the fuel and air for multiplied by the lambda ratio λ multiplied by the mass flow of the fuel $m_{fuel}$. A mass flow estimate can be obtained based on the total engine flow of air minus the EGR mass flow. The controller is arranged for manipulating the determined mass flow based on the recirculation of exhaust gas. The lambda ratio may be derived from a lambda sensor or oxygen concentration sensor. The step of checking the pressure sensor is optional, but allows the system to differentiate between a clogged filter and pressure sensor failure.

In this example the system an oxygen concentration sensor 15 for measuring oxygen concentration in an exhaust of the engine. The system is arranged for processing the measure oxygen concentration in combination with the exhaust flow and differential pressure to determining a statistical off-set in measured differential pressure. The system is arranged to suppress a clogging alarm signal when the off-set exceeds a predetermined value, such as 0.4 kPa. The system may be arranged to compensate for the off-set in the measured differential pressure for determining the first filter coefficient. Also separate from this example it is possible to manipulate the measured differential pressure based on a determined differential pressure sensor means off-set. To this end it is only required for the system to comprise an oxygen concentration sensor and a controller for determining the offset based on the air-to-fuel ratio measurement according to function 5 below.

$$qm_{air\_est}=\lambda\cdot L_{stoich}\cdot qm_{fuel}$$

$$m_{air}=\lambda\cdot L_{stoichiometry}\cdot m_{fuel} \qquad \text{function 5}$$

The controller is arranged for suppressing a clogging alarm signal and for generating a pressure sensor alarm signal when, in use, the off-set exceeds an off-set boundary value. Sensor off-set greater than a 0.4 kPa may cause the detection of a clogged filter erroneously. Using this method the driver of a vehicle or user of the system can now to differentiate between a clogged filter and a defective pressure sensor.

One manner for determining whether the pressure sensor is faulty will be described more detailed herein below.

Pressure Sensor Check (II)

For a given constant air filter resistance, the relation between the volume flow through the filter and the pressure drop over the filter is approximately quadratic. However, due to fouling or water ingress the air filter resistance can vary. Also, the pressure drop over the air filter is measured with a relative pressure sensor providing the under pressure before the compressor inlet relative to the ambient pressure. Hence, the measured pressure signal can deviate from the pressure drop over the air filter due to, e.g., ram air and might suffer from an offset due to production tolerances.

Therefore, from a single measurement, it is not possible to distinguish a clogged air filter from a faulty sensor. However, it is necessary to diagnose the pressure sensor with a plausibility check as well as to detect a clogged air filter as a replacement of the mechanical sensor.

This report provides the proof-of-concept of an algorithm for combined estimation of the air filter resistance and pressure sensor offset estimation. The algorithm requires an estimation of the fresh air mass flow, e.g., coming from the O2 concentration sensor in the exhaust or from the venturi EGR mass flow and total engine mass flow.

Using the proposed least squares filter, it is possible to simultaneously estimate the air filter resistance and pressure sensor offset with sufficient accuracy for clogged air filter detection.

Extreme variations are estimated within the length of one drive cycle.

Least Squares Estimation

For a given filter resistance and known mass flow through the filter, the pressure drop over the air filter can be estimated with the following quadratic relation:

$$dp_{af\_est} = C_{af}\cdot T_{a\_amb}\cdot qm_{air\_est}{}^2/p_{a\_amb} \qquad \text{function 6}$$

$$dp_{af\_est} = \frac{C_{af}\cdot T_{a\_amb}\cdot qm_{air\_est}^2}{p_{a\ amb}}$$

Where $dp_{af\_est}$ is the estimated pressure drop over the air filter, $C_{af}$ is the air filter resistance, $T_{a\_amb}$ is the ambient temperature, $qm_{air\_est}$ (also $m_{air}$ in other functions) is an estimate of the air mass flow through the air filter, and $p_{a\_amb}$ is the absolute ambient pressure. The air-to-fuel ratio measurement provides a relatively slow but accurate estimate of the fresh air flow:

$$qm_{air\_est}=\lambda\cdot L_{stoich}\cdot qm_{fuel}$$

$$qm_{air\_est}=\lambda\cdot L_{stoich}\cdot qm_{fuel} \qquad \text{function 7}$$

Here, $L_{stoich}$ is the stoichiometric air-to-fuel ratio, $qm_{fuel}$ is the fuel mass flow. Alternatively, a mass flow estimate can be obtained based on the total engine flow minus the EGR mass flow. Hence, errors in the estimated fresh air flow will directly translate in wrong fit. Function 7 is similar to function 5.

Figure 3:
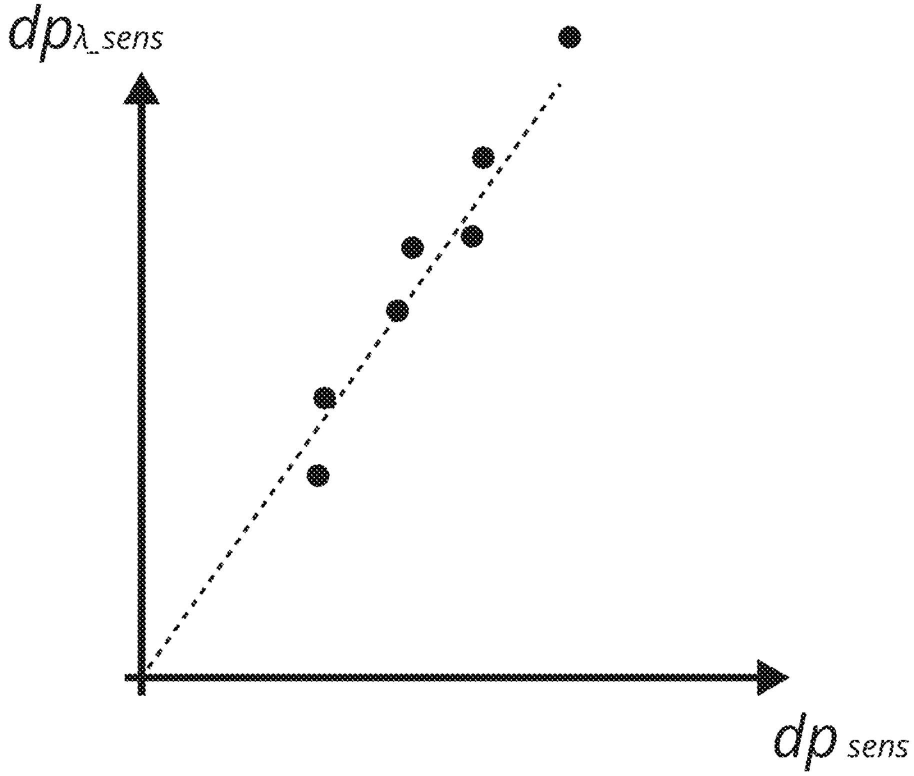
FIG. 3 shows a schematic of the relation to be fitted with on the x-axis the measured relative pressure and the y-axis the pressure drop estimate based on the lambda signal.

FIG. 3 Schematic of the relation to be fitted with on the x-axis the measured relative pressure and the y-axis the pressure drop estimate based on the lambda signal.

The estimated pressure drop $dp_{af\_est}$ can be compared with the measured relative pressure $dp_{af\_sens}$, in which the measured relative pressure signal might suffer from an offset. If only a single point in time is compared, one cannot distinguish filter clogging from sensor offset. However, if historical data is available, at different pressure levels, an affine relation can be assumed between estimated pressure drop and the measured relative pressure, see also FIG. 3.

$$dp_{af\_sens}=b_0+b_1 \cdot dp_{af\_est}$$

$$qm_{air\_est}=\lambda \cdot L_{stoich} \cdot qm_{fuel} \qquad \text{function 8}$$

Where $b_0$ and $b_1$ are unknown parameters which ideally have the value $b_0=0$ and slope $b_1=1$. Parameters $b_0$ and $b_1$ can be found using a least squares estimate based on historical data of $dp_{af\_sens}$ and $dp_{af\_est}$, i.e. by minimizing the following quadratic cost function 9:

$$S=\Sigma^{n}_{i=1}\,(dp_{af\_sens}-(b_0+b_1 \cdot dp_{af\_est}))^2$$

$$qm_{air\_est}=\lambda \cdot L_{stoich} \cdot qm_{fuel} \qquad \text{function 9}$$

Where i indicates the ith stored data sample, and n is the number of the stored samples. Minimizing the sum of squares results in $b_0$ and $b_1$ that best fit the data.

Solving this system of equations leads to the following estimates of $b_0$ and $b_1$:

$$b_1 = \left(n\sum dp_{af\_est} \cdot dp_{ad\_sens} - \sum dp_{af\_est} \cdot dp_{ad\_sens}\right) \qquad \text{function 10}$$

$$/\left(n\sum dp^2_{af\_est} - \left(\sum dp_{af\_est}\right)^2\right.$$

$$qm_{air\_est} = \lambda \cdot L_{stoich} \cdot qm_{fuel}$$

$$b_0 = (1/n) \cdot \left(\sum dp_{af\_sens} - b_1\sum dp_{af\_est}\right) \qquad \text{function 11}$$

$$qm_{air\_est} = \lambda \cdot L_{stoich} \cdot qm_{fuel}$$

$$b_1 = \frac{n\sum dp_{af\_est} \cdot dp_{af\_sens} - \sum dp_{af\_est}\sum dp_{af\_sens}}{n\sum dp^2_{af\_est} - \sum \left(dp_{af\_est}\right)^2}$$

Finally, we want $b_0$ to converge to zero by compensating the sensor with an offset, and $b_1$ to converge to 1 by adjusting the filter resistance $C_{af}$ that is used in (1).

For implementation functions 6 to 11 are implemented in the controller and validated on the test bench.

Low air-to-fuel ratio indicates transient engine behavior and is therefore excluded from the fit. Also, the measurements of high air-to-fuel ratios become increasingly more unreliable and therefore excluded from the fitting procedure by disabling the block using a calibrate-able parameter.

Moreover, note that, the denominator in function 10 becomes zero if the measured relative pressure is constant i.e. sufficient excitation is needed to make a reliable fit. Hence, based on the size of the denominator in function 10, the fit result can be disregarded.

Figure 4:
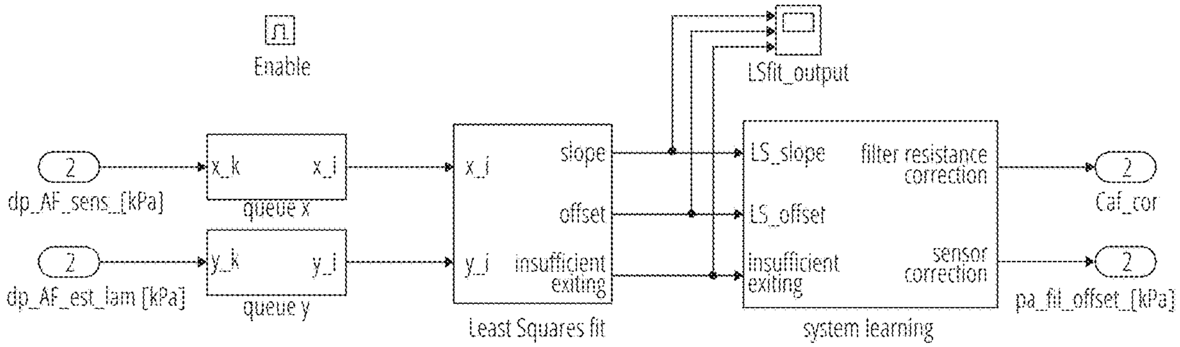
FIG. 4 shows an overview of a least squares implementation in schematic overview for pressure sensor off-set determination.
Figure 5:
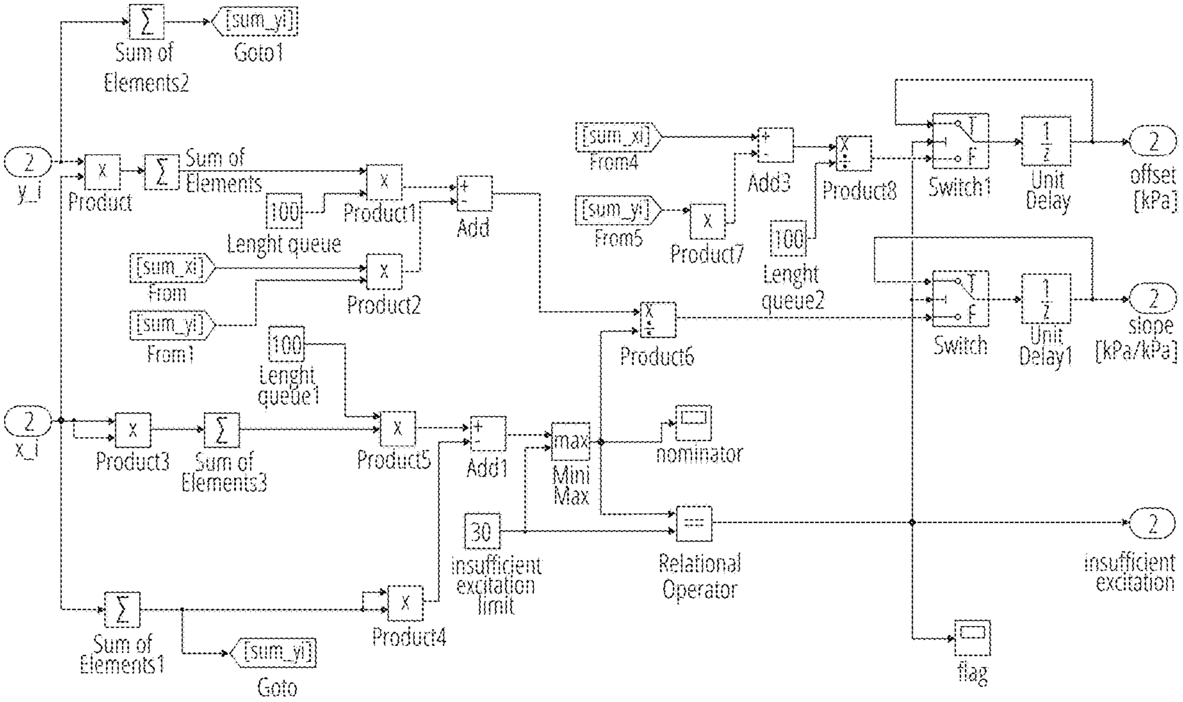
FIG. 5 shows an implementation of the least squares filter in schematic overview for pressure sensor off-set determination.
Figure 6:
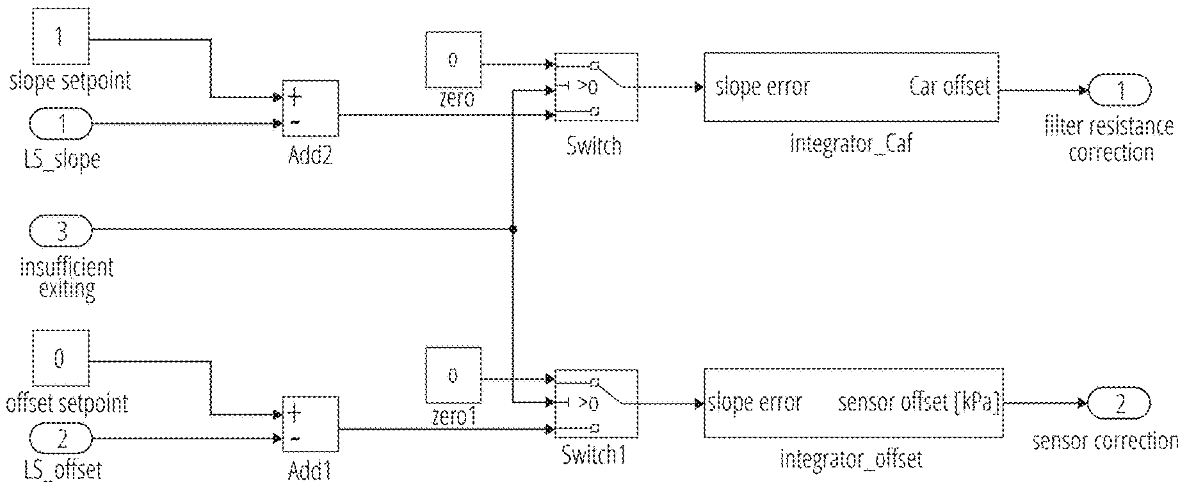
FIG. 6 shows in schematic overview the adjustment of filter resistance and sensor offset.

FIG. 4 shows this least squares implementation in schematic overview. FIG. 5 shows an implementation of the least squares filter as well. The filter resistance and sensor offset may also be adjusted as can be seen from FIG. 6. Which means that the measured offset can be compensated for going forward in the processing of sensor data from the differential pressure sensor.

Figure 7:
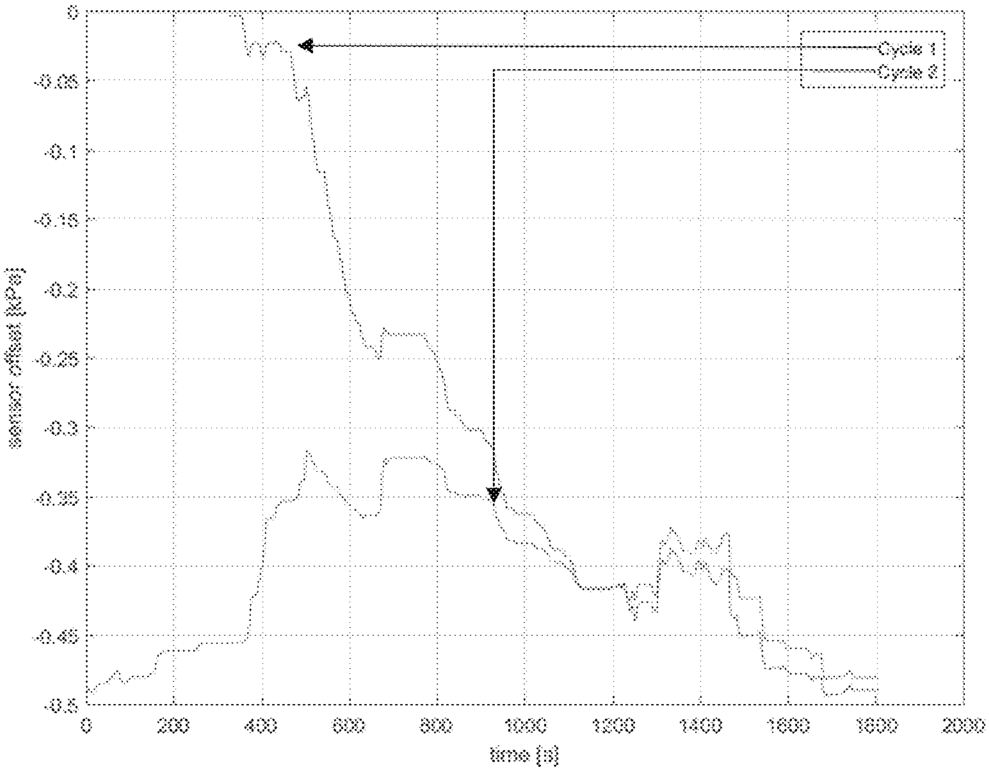
FIG. 7 shows a graph wherein over time sensor off-set can be adjusted for through iteration based on ongoing measurements.

The algorithm has been tested on a drive cycle where the pressure sensor is provided with a deliberate static offset of 0.4 kPa. It can be seen that the sensor offset is estimated within one drive cycle, this is also shown in FIG. 7.

Air Filter Clogging Monitor Overview of Monitoring Concepts

Figure 8:
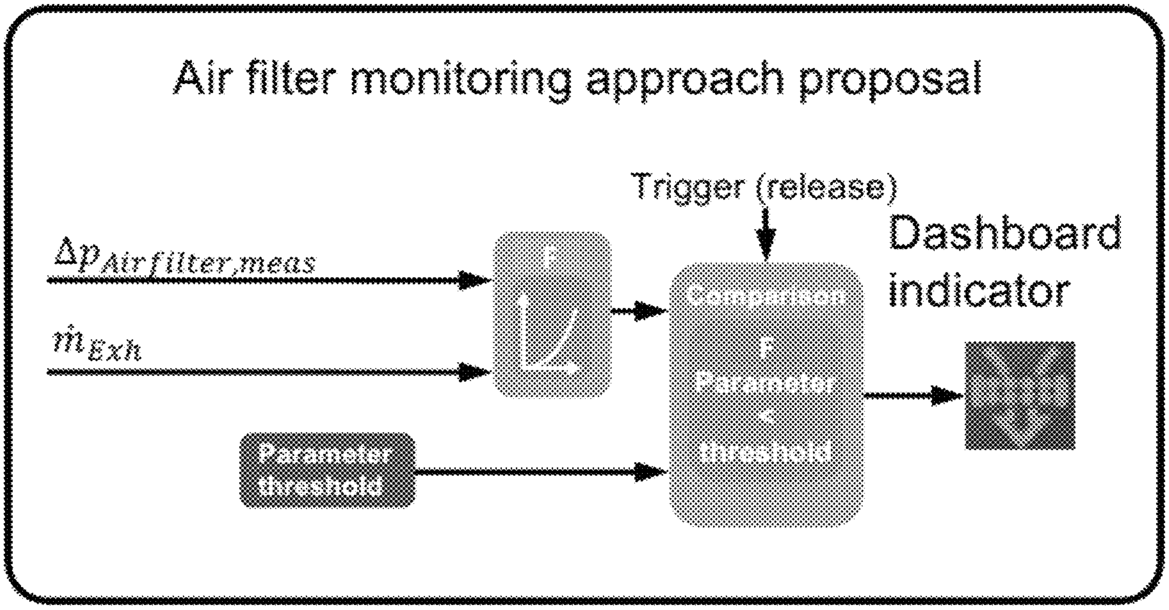
FIG. 8 shows schematically the air filter monitoring approach and respective inputs.
Figure 9:
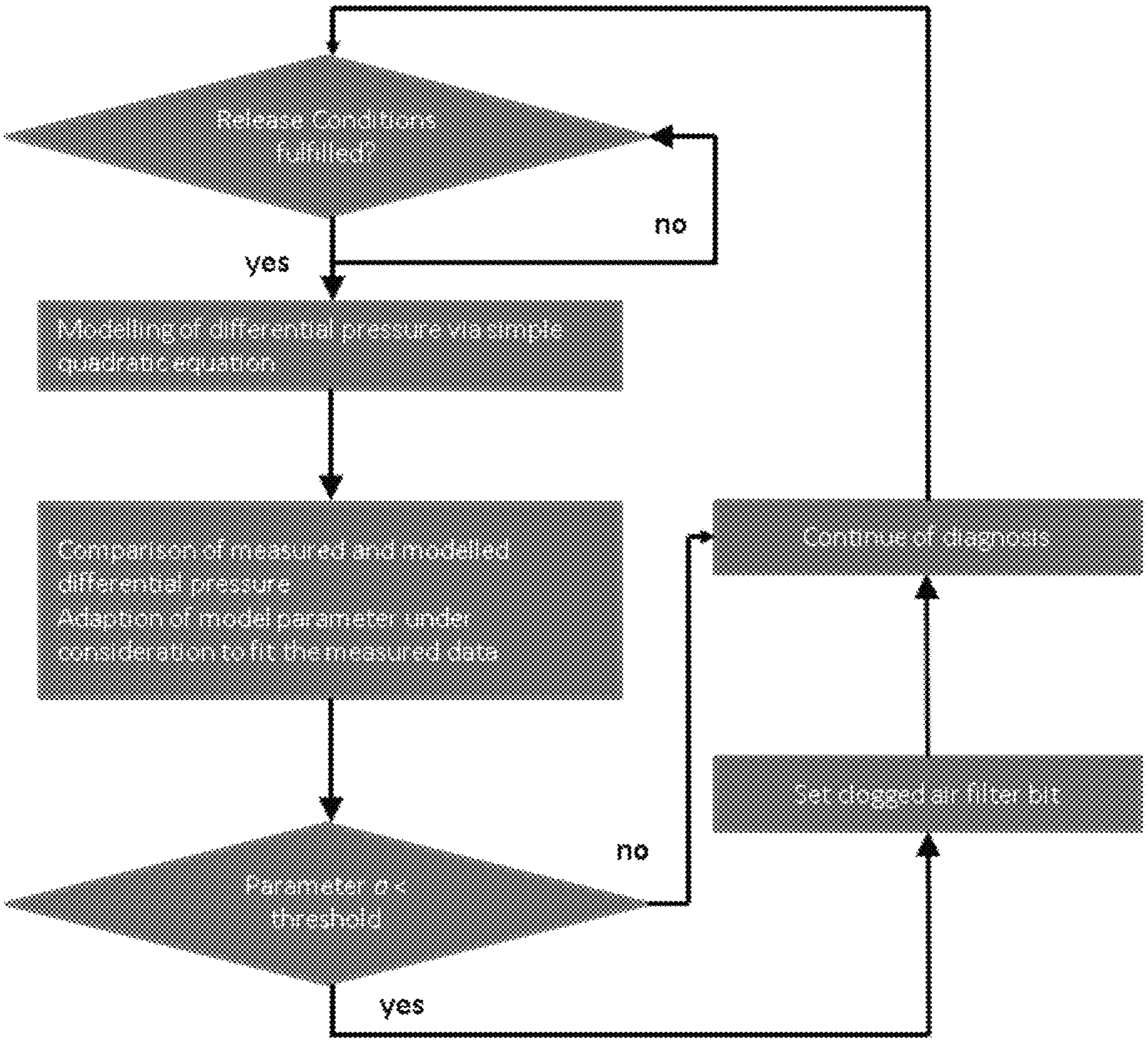
FIG. 9 shows a flow diagram of the air filter clogging monitor flow diagram as extension of the diagram shown in FIG. 2.

A simple flow structure for the filter monitor is shown in FIG. 8. Here it can be seen how a dashboard light can be triggered to indicate filter problems. In FIG. 8 F stands for (air) Filter, wherein the air filter resistance and pressure sensor offset are analysed via the least square filter. The process according to FIG. 2 is again shown in a different manner in FIG. 9. Here it can be seen that the model continuous diagnosis even after clogged air filter bit is set (alarm signal given). This means that the system may be allowed to continue operating after an alarm signal has been given. This situation can be seen as a sensor and data fusion algorithm.

It is thus believed that the operation and construction of the present invention will be apparent from the foregoing description and drawings appended thereto. For the purpose of clarity and a concise description features are described herein as part of the same or separate embodiments, however, it will be appreciated that the scope of the invention may include embodiments having combinations of all or some of the features described. References to published material or sources of information contained in the text should not be construed as concession that this material or information was part of the common general knowledge in this country or abroad. Each document, reference or patent publication cited in this text should be read and considered by the reader as part of this text, and for reasons of conciseness the contents thereof is not repeated, duplicated or copied in this text. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim. The terms 'comprise', 'comprising' and 'including' when used in this description or the appended claims should not be construed in an exclusive or exhaustive sense but rather in an inclusive sense. Thus expression as 'including' or 'comprising' as used herein does not exclude the presence of other elements, integers, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extend that structure, material, or acts are considered to be essential they are inexpressively indicated as such. Additions, deletions, and modifications within the purview of the skilled person may generally be made without departing from the scope of the invention, as determined by the claims.

The invention claimed is:

1. A monitoring system for detecting clogging through fouling of an air filter of an internal combustion engine comprising:

a differential pressure sensor for determining a differential pressure between an ambient environment and a position directly downstream of the air filter;

at least one exhaust flow sensor for determining an exhaust flow; and a controller which is communicatively connected to each of the differential pressure sensor and the at least one exhaust flow sensor for processing information therefrom, wherein the controller is arranged for determining a first filter resistance coefficient based on, at least, a measurement of the differential pressure, and the exhaust flow, wherein the system is arranged for using the controller, to calculate a second filter resistance coefficient based on a historic evolution of the first filter resistance coefficient, and to compare the second filter resistance coefficient to a boundary value, and for generating a clogging alarm signal when the second filter resistance coefficient exceeds said boundary value.

2. The system according to claim 1, wherein the system is arranged, by the controller, for logging the first filter resistance coefficient over time, for fitting a function over at least some of the logged data, and for predicting the first filter resistance coefficient, and wherein the calculation of the second filter resistance coefficient comprises updating the first filter resistance coefficient by a predicted filter resistance coefficient from the function.

3. The system according to claim 1, wherein the controller is arranged for using linear quadratic estimation, for determining the first filter resistance coefficient.

4. The system according to claim 3, wherein the controller is arranged to model the differential pressure as a function of the exhaust flow, wherein the first filter resistance coefficient is defined by a model parameter of the function, and wherein the function is a quadratic function.

5. The system according to claim 4, wherein the second filter resistance coefficient is calculated based on the historic evolution of the first filter resistance coefficient, by comparing the measured and modelled differential pressures, wherein the model parameter is determined based on multiple sequential measurements of the differential pressure and the exhaust flow, to compensate for measurement noise and/or model uncertainties.

6. The system according to claim 1, wherein the calculation of the second filter resistance coefficient based on the historic evolution of the first filter resistance coefficient is provided by a weighted sum of the first filter resistance coefficient having a first weight and a historic resistance coefficient having a second weight.

7. The system according to claim 1, wherein the calculation of the second filter resistance coefficient based on the historic evolution of the first filter resistance coefficient is provided by a weighted sum of the first filter resistance coefficient having a first weight and a historic resistance coefficient having a third weight wherein the historic resistance coefficient is calculated based on multiple sequential measurements of the differential pressure and the exhaust flow.

8. The system according to claim 1, wherein the system is arranged to be inactive at an air flow below 100 g/s.

9. The system according to claim 1, wherein the second filter resistance coefficient is compared to the boundary value at predetermined time intervals.

10. The system according to claim 1, wherein the system comprises an oxygen concentration sensor for measuring oxygen concentration in the exhaust flow, wherein the system is arranged for processing the oxygen concentration in combination with the exhaust flow and the differential pressure to determine a statistical offset in the measured differential pressure, and wherein the system is arranged to suppress the clogging alarm signal when the offset exceeds a predetermined value.

11. The system according to claim 10, wherein the system is arranged to compensate for the offset in the measurement of the differential pressure for determining the first filter resistance coefficient.

12. The system according to claim 10, wherein the controller is arranged for suppressing the clogging alarm signal and/or for generating a pressure sensor alarm signal, when the offset exceeds an offset boundary value.

13. The system according to claim 1, wherein the controller is arranged for manipulating the determined exhaust flow based on recirculation of exhaust gas.

14. A vehicle comprising the system according to claim 13, wherein the vehicle comprises a human interface arranged for generating an audio and/or visual alarm based on the clogging alarm signal.

15. The vehicle according to claim 14, wherein the vehicle comprises the human interface arranged for generating a clogging alarm and for generating a pressure sensor alarm, based on the clogging alarm signal and a pressure sensor alarm signal respectively.

16. A method for detecting clogging through fouling of an air filter to an internal combustion engine wherein the method comprises:

measuring a differential pressure, using a differential pressure sensor, between an ambient environment and a position directly downstream of the air filter of the engine;

measuring an exhaust flow in an exhaust of the engine;

determining a first filter resistance coefficient based on, at least, the differential pressure, and the exhaust flow;

calculating a second filter resistance coefficient based on a historic evolution of the first filter resistance coefficient;

comparing the second filter resistance coefficient to a boundary value;

generating a clogging alarm signal when the second filter resistance coefficient exceeds said boundary value.

17. The method according to claim 16, wherein the method comprises logging the first filter resistance coefficient over time, and fitting a function over at least some of the logged data, for predicting the first filter resistance coefficient, and wherein calculating the second filter resistance coefficient comprises updating the first filter resistance coefficient by a predicted filter resistance coefficient from the function.

18. The method according to claim 16, wherein the method comprises using a linear quadratic estimation for determining the first filter resistance coefficient.

19. The method according to claim 18, wherein the method comprises modelling the differential pressure as a function of the exhaust flow, wherein the first filter resistance coefficient is defined by a model parameter of the function, and wherein the function is a quadratic function.

20. The method according to claim 19, wherein calculating the second filter resistance coefficient based on the historic evolution of the first filter resistance coefficient involves comparing the measured and modelled differential pressures, wherein the model parameter is determined based on multiple sequential measurements of the differential pressure and the exhaust flow, to compensate for measurement noise and/or model uncertainties.

* * * * *